United States Patent
Onoe et al.

(10) Patent No.: US 11,110,435 B2
(45) Date of Patent: Sep. 7, 2021

(54) EXHAUST GAS PURIFICATION CATALYST

(71) Applicant: CATALER CORPORATION, Shizuoka (JP)

(72) Inventors: Ryota Onoe, Shizouka (JP); Kazuhiko Ito, Shizuoka (JP); Takahiro Harada, Shizuoka (JP); Chihiro Kasuya, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 229 days.

(21) Appl. No.: 16/086,083

(22) PCT Filed: Mar. 13, 2017

(86) PCT No.: PCT/JP2017/010011
§ 371 (c)(1),
(2) Date: Sep. 18, 2018

(87) PCT Pub. No.: WO2017/159628
PCT Pub. Date: Sep. 21, 2017

(65) Prior Publication Data
US 2020/0290019 A1   Sep. 17, 2020

(30) Foreign Application Priority Data
Mar. 18, 2016 (JP) .............................. JP2016-054840

(51) Int. Cl.
*B01J 23/10* (2006.01)
*B01J 23/44* (2006.01)
(Continued)

(52) U.S. Cl.
CPC .......... *B01J 23/464* (2013.01); *B01D 53/945* (2013.01); *B01J 23/10* (2013.01); *B01J 23/44* (2013.01);
(Continued)

(58) Field of Classification Search
CPC . B01J 23/10; B01J 23/44; B01J 23/464; B01J 35/0006; B01J 35/04; F01N 3/2839
See application file for complete search history.

(56) References Cited

U.S. PATENT DOCUMENTS 5,459,119 A * 10/1995 Abe ..................... B01J 37/0248
502/326
5,597,771 A * 1/1997 Hu ....................... B01D 53/945
502/304

(Continued)

FOREIGN PATENT DOCUMENTS

EP     0640381 A1    3/1995
JP     62-68543      3/1987

(Continued)

OTHER PUBLICATIONS

Extended Search Report for European Application No. 17766628.6 dated Jan. 25, 2019.

(Continued)

*Primary Examiner* — Cam N. Nguyen
(74) *Attorney, Agent, or Firm* — Occhiuti & Rohlicek LLP (57) ABSTRACT

An exhaust gas purification catalyst comprises a substrate; a catalyst layer formed on the substrate and containing at least palladium (Pd) and rhodium (Rh) as a metal functioning as an oxidation and/or reduction catalyst. The catalyst also comprises a carrier that supports the metal, and an OSC material having oxygen storage capacity. The catalyst layer has, when disposed in the exhaust pipe, a front section positioned upstream in an exhaust gas flow direction within the exhaust pipe, and a rear section positioned downstream of the front section in the exhaust gas flow direction. The front section contains palladium (Pd) but does not contain the OSC material, and a proportion, at which the front section is formed from an upstream leading end in the (Continued)

exhaust gas flow direction, is 10% to 40% with respect to 100% of a total length of the substrate.

5 Claims, 5 Drawing Sheets

(51) Int. Cl.
- *B01J 35/00* (2006.01)
- *B01J 35/04* (2006.01)
- *F01N 3/28* (2006.01)
- *B01J 23/46* (2006.01)
- *B01D 53/94* (2006.01)

(52) U.S. Cl.
CPC .......... *B01J 35/0006* (2013.01); *B01J 35/04* (2013.01); *F01N 3/2839* (2013.01); *B01D 2255/1023* (2013.01); *B01D 2255/1025* (2013.01); *B01D 2255/903* (2013.01); *B01D 2255/908* (2013.01); *B01D 2255/9022* (2013.01); *F01N 2370/02* (2013.01)

(56) References Cited

U.S. PATENT DOCUMENTS

| | | | | |
|---|---|---|---|---|
| 5,948,723 A * | 9/1999 | Sung | ............... | B01J 35/0006 502/303 |
| 6,087,298 A * | 7/2000 | Sung | ............... | B01D 53/9472 502/333 |
| 7,517,510 B2 * | 4/2009 | Chen | ............... | B01D 53/945 423/213.2 |
| 7,524,465 B2 * | 4/2009 | Kumar | ............... | B01J 23/44 422/180 |
| 7,550,124 B2 * | 6/2009 | Chen | ............... | B01J 37/0248 423/213.2 |
| 7,758,834 B2 * | 7/2010 | Chen | ............... | B01J 37/0248 423/213.2 |
| 8,057,745 B2 * | 11/2011 | Toyoda | ............... | F01N 13/009 422/171 |
| 8,066,963 B2 * | 11/2011 | Klingmann | ............... | B01D 53/945 423/213.5 |
| 8,211,392 B2 * | 7/2012 | Grubert | ............... | B01D 53/944 423/213.2 |
| 8,323,599 B2 * | 12/2012 | Nunan | ............... | B01J 23/464 423/213.2 |
| 8,394,348 B1 * | 3/2013 | Nunan | ............... | B01J 23/42 423/213.2 |
| 8,557,204 B2 * | 10/2013 | Nunan | ............... | B01J 23/464 423/213.5 |
| 8,640,440 B2 * | 2/2014 | Klingmann | ............... | B01J 35/04 60/274 |
| 8,906,330 B2 * | 12/2014 | Hilgendorff | ............... | B01J 23/40 423/213.5 |
| 8,950,174 B2 * | 2/2015 | Hilgendorff | ............... | B01J 35/023 60/299 |
| 8,968,690 B2 * | 3/2015 | Nunan | ............... | B01D 53/945 423/213.5 |
| 9,242,242 B2 * | 1/2016 | Hilgendorff | ............... | B01J 23/63 |
| 9,266,092 B2 * | 2/2016 | Arnold | ............... | B01J 37/0244 |
| 9,486,793 B2 * | 11/2016 | Klingmann | ............... | B01J 21/04 |
| 9,511,360 B2 * | 12/2016 | Wille | ............... | B01J 23/464 |
| 9,517,462 B2 * | 12/2016 | Roesch | ............... | B01J 37/0244 |
| 9,522,360 B2 * | 12/2016 | Schmidt | ............... | B01D 53/945 |
| 9,579,633 B2 * | 2/2017 | Suzuki | ............... | B01J 23/63 |
| 9,675,970 B2 * | 6/2017 | Matsueda | ............... | B01J 35/0013 |
| 9,694,348 B2 * | 7/2017 | Hoshino | ............... | B01J 35/0006 |
| 9,732,648 B2 * | 8/2017 | Yamada | ............... | F01N 3/0835 |
| 9,744,529 B2 * | 8/2017 | Xue | ............... | B01J 35/04 |
| 9,839,902 B2 * | 12/2017 | Suzuki | ............... | B01J 35/1014 |
| 9,981,250 B2 * | 5/2018 | Wille | ............... | B01D 53/945 |
| 9,981,258 B2 * | 5/2018 | Xue | ............... | B01J 35/04 |
| 10,337,372 B2 * | 7/2019 | Nobukawa | ............ | F01N 3/0842 |
| 2004/0001781 A1 | 1/2004 | Kumar et al. | | |
| 2006/0128562 A1 | 6/2006 | Miyoshi et al. | | |
| 2008/0044330 A1 * | 2/2008 | Chen | ............... | B01D 53/945 423/213.5 |
| 2008/0072578 A1 * | 3/2008 | Kumar | ............... | F01N 3/22 60/299 |
| 2009/0041643 A1 | 2/2009 | Deeba et al. | | |
| 2009/0087365 A1 * | 4/2009 | Klingmann | ............ | B01J 35/023 423/213.5 |
| 2009/0175773 A1 * | 7/2009 | Chen | ............... | B01D 53/9472 423/213.5 |
| 2012/0128557 A1 | 5/2012 | Nunan et al. | | |
| 2012/0128558 A1 * | 5/2012 | Nunan | ............... | B01D 53/9472 423/213.5 |
| 2013/0058848 A1 * | 3/2013 | Nunan | ............... | B01D 53/9477 423/213.5 |
| 2013/0150236 A1 * | 6/2013 | Aoki | ............... | B01J 35/0006 502/303 |
| 2013/0189173 A1 * | 7/2013 | Hilgendorff | ......... | B01D 53/945 423/213.5 |
| 2013/0310248 A1 | 11/2013 | Aoki et al. | | |
| 2014/0241964 A1 * | 8/2014 | Bergeal | ............... | B01J 37/0234 423/213.5 |
| 2015/0375206 A1 * | 12/2015 | Aoki | ............... | B01J 23/464 502/303 |
| 2016/0199816 A1 | 7/2016 | Matsueda et al. | | |
| 2016/0243501 A1 * | 8/2016 | Greenwell | ............... | B01J 23/63 |
| 2017/0043322 A1 * | 2/2017 | Chandler | ............... | B01J 23/58 |
| 2018/0361360 A1 * | 12/2018 | Xue | ............... | B01J 23/10 |
| 2019/0331013 A1 * | 10/2019 | Sung | ............... | B01J 23/63 |

FOREIGN PATENT DOCUMENTS

| | | |
|---|---|---|
| JP | 62-068543 | 3/1987 |
| JP | 06-142520 | 5/1994 |
| JP | H07166853 A | 6/1995 |
| JP | 9-085055 | 3/1997 |
| JP | 9-85055 | 3/1997 |
| JP | 2000-502602 | 3/2000 |
| JP | 2005-161311 | 6/2005 |
| JP | 2006-159159 | 6/2006 |
| JP | 2009-273988 | 11/2009 |
| JP | 2010-179200 | 8/2010 |
| JP | 2012-040547 | 3/2012 |
| JP | 2014-509241 | 4/2014 |
| JP | 2014-509242 | 4/2014 |
| JP | 2015175274 A | 10/2015 |
| JP | 2016-026112 | 2/2016 |
| WO | WO97/23278 | 7/1997 |
| WO | WO2011/081219 | 7/2011 |
| WO | WO2012/069404 | 5/2012 |
| WO | WO2012/069405 | 5/2012 |
| WO | WO 2015/052569 | 4/2015 |
| WO | 2015087872 A1 | 6/2015 |

OTHER PUBLICATIONS

Chinese Office Action dated Sep. 11, 2020 in CN Application No. 201780018147.5.
Japanese Office Action dated Mar. 18, 2021 in JP Application No. 2018-505923.
Chinese Office Action dated Apr. 28, 2021 in CN Application No. 201780018147.5.

* cited by examiner

EXHAUST GAS PURIFICATION CATALYST

CROSS REFERENCE TO RELATED APPLICATIONS

This application is a National Stage of International Application No. PCT/JP2017/010011 filed on Mar. 13, 2017, which claims priority to Japanese Application No. 2016-054840 filed on Mar. 18, 2016, the contents of which are hereby incorporated by reference in their entirety.

TECHNICAL FIELD

The present invention relates to an exhaust gas purification catalyst that is provided in an exhaust system of an internal combustion engine. More particularly, the present invention relates to an exhaust gas purification catalyst that contains at least palladium (Pd) as a catalyst metal, and further contains an oxygen storing/releasing material (OSC material).

The present international patent application claims priority based on Japanese Patent Application No. 2016-054840, filed on Mar. 18, 2016, the entire contents whereof are incorporated in the present description by reference.

BACKGROUND ART

So-called three-way catalysts are used as exhaust gas purification catalysts for removal, through an oxidation or reduction reaction, of harmful components such as hydrocarbons (HC), carbon monoxide (CO) and nitrogen oxides (NOx) from the exhaust gas emitted by an internal combustion engine such as an automobile engine. As three-way catalysts, for instance, a catalyst is used in which a metal, which functions as an oxidation catalyst and/or a reduction catalyst (i.e., typically a noble metal pertaining to the platinum group such as palladium (Pd) or rhodium (Rh); hereafter also referred to as "catalyst metal" for short), is supported on a porous carrier made up of a metal oxide such as alumina ($Al_2O_3$) or zirconia ($ZrO_2$). For instance, three-way catalysts are widely used in which Pd as an oxidation catalyst and Rh as a reduction catalyst are supported on a porous carrier.

Further, an oxygen storage material (hereafter referred to as "OSC material") having oxygen storage capacity, for instance ceria ($CeO_2$) or the like, is used as a promoter that allows enhancing the exhaust gas purification function of the three-way catalyst. Thanks to the co-presence of the OSC material, oxygen is stored from an exhaust gas atmosphere with excess oxygen (lean atmosphere), and is released to an exhaust gas atmosphere with little oxygen (rich atmosphere); thereby, the periphery of the catalyst can be brought as close as possible to a stoichiometric air-fuel ratio. It becomes as a result possible to improve the exhaust gas purification function of the three-way catalyst towards exhaust gas having an air-fuel ratio that deviates from the stoichiometric air-fuel ratio. For instance, Patent Literature 1 to 3 describe conventional techniques relating to configurations of three-way catalysts that contain an OSC material.

CITATION LIST

Patent Literature

Patent Literature 1: Japanese Translation of PCT Application No. 2014-509241

Patent Literature 2: Japanese Translation of PCT Application No. 2014-509242

Patent Literature 3: Japanese Patent Application Publication No. 2006-159159

SUMMARY OF INVENTION

Hybrid cars and so-called green vehicles equipped with energy-saving mechanisms such as idling stopping have become widespread in recent years, in the wake of increased environmental consciousness and societal shift towards energy conservation. In such vehicle types the engine frequently stops also during operation. A comparatively large amount of unburned hydrocarbons (HC) tends to be emitted during engine startup (in particular engine startup in a comparatively cold state). Purification of HC emitted during startup has therefore become an increasingly important issue as such green vehicles have gained in popularity.

However, there was room for improvement as regards the configuration (structure) of exhaust gas purification catalysts of a type in which the catalyst contains a conventional OSC material. The present invention was arrived at with the aim of providing an exhaust gas purification catalyst of OSC material-containing type that allows realizing good HC purification (HC oxidation treatment) even when HC emissions (emission amount) are comparatively large, as during engine startup.

The inventors found that an oxidation purification treatment of HC from exhaust gas (typically exhaust gas after combustion with a rich air-fuel ratio) emitted during a process from startup of an internal combustion engine (gasoline engine or the like) up to warm-up running can be enhanced, firstly, through introduction of the exhaust gas into a Pd-containing catalyst layer around which no OSC material is present. Further, the inventors found that an HC oxidation purification treatment (mainly by Pd) and a NOx reduction purification treatment (mainly by Rh) are both achieved at a high level, by prescribing that the length of the OSC material-absent Pd-containing catalyst layer with respect to the total length of the exhaust gas purification catalyst along the exhaust gas flow direction (exhaust gas introduction direction), should lie within a predetermined range, and perfected the present invention on the basis of that finding.

The present invention provides an exhaust gas purification catalyst for being disposed in an exhaust pipe of an internal combustion engine and purifying exhaust gas emitted by the internal combustion engine.

The exhaust gas purification catalyst disclosed herein has: a substrate; and a catalyst layer formed on the substrate, and contains (1) at least palladium (Pd) and rhodium (Rh) as a metal (catalyst metal) functioning as an oxidation and/or reduction catalyst, (2) a carrier that supports the metal, and (3) an OSC material (or referred to as an oxygen storing material) having oxygen storage capacity.

The catalyst layer has, when disposed in the exhaust pipe, a front section positioned upstream in an exhaust gas flow direction within the exhaust pipe, and a rear section positioned downstream of the front section in the exhaust gas flow direction. The front section contains palladium (Pd) as the metal but does not contain an OSC material. Herein the proportion, at which the front section is formed from the upstream leading end in the exhaust gas flow direction, is 10% to 40% with respect to 100% of the total length of the substrate in the exhaust gas flow direction.

The term "upstream leading end" denotes a leading end site of the catalyst layer positioned furthest upstream in the exhaust pipe, in a state where the exhaust gas purification catalyst is disposed at a predetermined position in the exhaust pipe (exhaust gas flow channel).

In the exhaust gas purification catalyst disclosed herein, as described above, no OSC material is contained in the front section that is positioned upstream in the exhaust gas flow direction. Reactivity of Pd with HC is increased (see test examples described below) in a catalyst layer where an OSC material is not co-present. The front section is a site at which exhaust gas containing an oxidizing component ($O_2$, NOx and the like) and water vapor can be introduced first, together with HC. Accordingly it becomes possible to increase the oxidation treatment efficiency of HC by the Pd disposed at the front section, and to reduce HC emissions.

In the exhaust gas purification catalyst disclosed herein, the length of the front section in the exhaust gas flow direction is 10% to 40% from the upstream leading end, with respect to 100% as the total length of the substrate in the exhaust gas flow direction. As a result, it becomes possible to increase both the HC oxidation treatment efficiency in the front section and the exhaust gas purification treatment efficiency in the rear section, at a high level.

In one preferred implementation of the exhaust gas purification catalyst disclosed herein, an OSC material-present Rh-containing catalyst layer that contains rhodium (Rh) as the catalyst metal and contains an OSC material is formed in at least part of the top face of the front section, as viewed in a direction perpendicular to the surface of the substrate.

An exhaust gas purification catalyst having such a configuration allows achieving, at a high level, both HC oxidation treatment efficiency in the front section and exhaust gas purification treatment efficiency (in particular of a NOx reduction treatment) in the OSC material-present Rh-containing catalyst layer that is adjacent to the front section.

In another preferred implementation of the exhaust gas purification catalyst disclosed herein, the rear section contains rhodium (Rh) as the catalyst metal and contains an OSC material, and part of the rear section makes up the OSC material-present Rh-containing catalyst layer.

An exhaust gas purification catalyst having such a configuration allows achieving, at a high level, both HC oxidation treatment efficiency in the rear section and exhaust gas purification treatment efficiency (in particular of a NOx reduction treatment) at the OSC material-present Rh-containing catalyst layer that is adjacent to the front section.

In another preferred implementation of the exhaust gas purification catalyst disclosed herein, the catalyst layer is a multilayer structure made up of at least two layers having mutually different configurations as viewed in a direction perpendicular to the surface of the substrate. With the front section and the rear section formed on the substrate as a catalyst first layer, and the layer formed on the first layer as a catalyst second layer, then the front section of the catalyst first layer contains palladium (Pd) as the catalyst metal but does not contain an OSC material. The rear section of the catalyst first layer contains palladium (Pd) as the catalyst metal, and contains an OSC material. The catalyst second layer contains rhodium (Rh) as the catalyst metal and contains an OSC material.

An exhaust gas purification catalyst having such a multilayer structure allows effectively subjecting HC to an oxidation treatment at the front section of the catalyst first layer, and to function as a good three-way catalyst by virtue of the OSC material and Pd in the rear section of the catalyst first layer, and the OSC material and Rh in the catalyst second layer.

DESCRIPTION OF EMBODIMENTS

Figure 1:
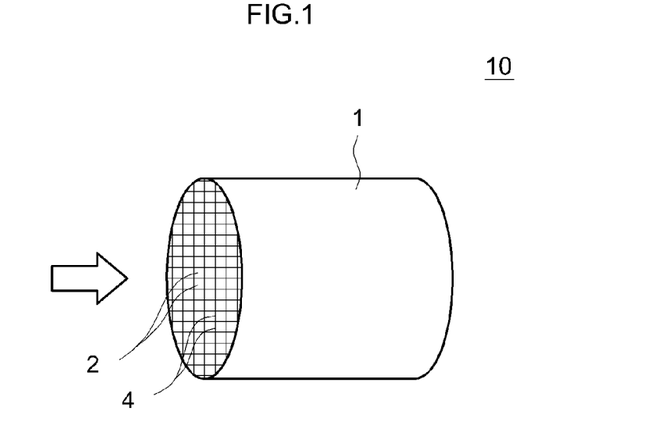
FIG. 1 is a perspective-view diagram illustrating schematically an exhaust gas purification catalyst according to an embodiment.
Figure 2:
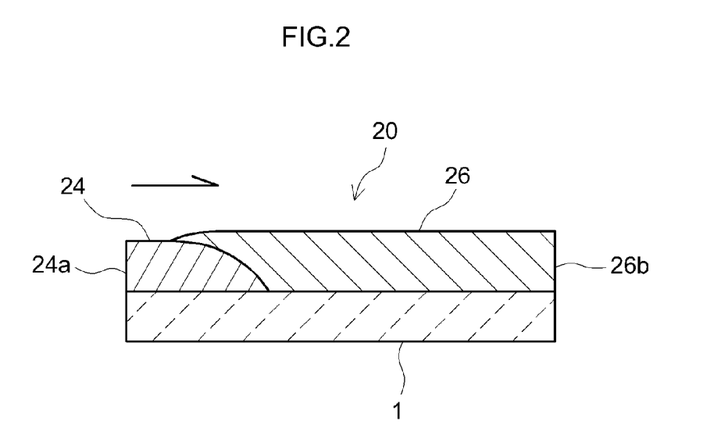
FIG. 2 is a cross-sectional diagram illustrating schematically a catalyst layer of an exhaust gas purification catalyst according to an embodiment.
Figure 3:
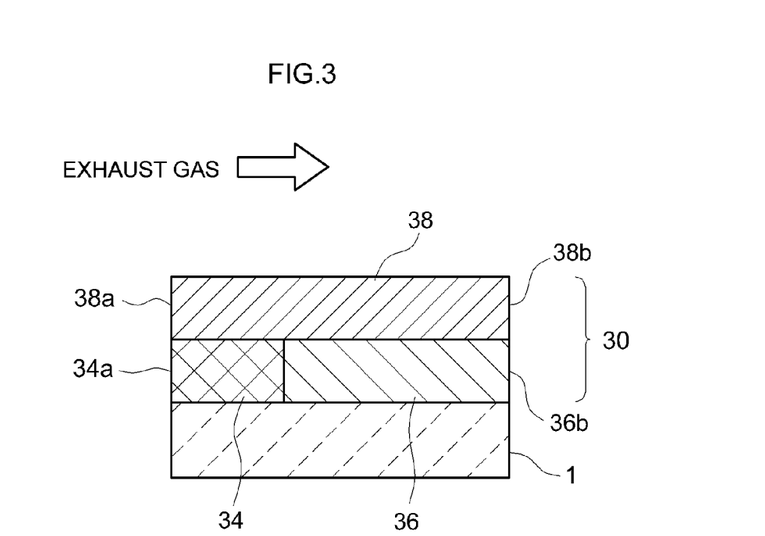
FIG. 3 is a cross-sectional diagram illustrating schematically a catalyst layer of an exhaust gas purification catalyst according to another embodiment.

Preferred embodiments of the present invention will be explained below with reference to accompanying drawings. Any features other than the features specifically set forth in the present description and which may be necessary for carrying out the present invention can be regarded as instances of design matter, for a person skilled in the art, based on conventional techniques in the technical field in question. The invention can be realized on the basis of the disclosure of the present description and common technical knowledge in the relevant technical field. FIG. 1 to FIG. 3 described below are depicted schematically for the purpose of allowing the present invention to be comprehended. The dimensional relationships (length, width, thickness and so forth) in the figures do not necessarily reflect actual dimensional relationships.

The exhaust gas purification catalyst disclosed herein is characterized in that the front section of the catalyst layer, positioned upstream in the exhaust pipe in which the exhaust gas purification catalyst is disposed, is defined as a catalyst region that contains Pd but does not contain an OSC material and in that the proportion, at which the front section is formed from the upstream leading end in the exhaust gas flow direction, is 10% to 40% with respect to 100% of the total length of the substrate. Therefore, other features are not particularly limited. The exhaust gas purification catalyst of the present invention can be disposed in the exhaust system (exhaust pipe) of various internal combustion engines, in particular a gasoline engine or a diesel engine of an automobile, through appropriate selection of the substrate, carrier (including an instance where the carrier is an OSC material), catalyst metal and so forth described below, and by forming of the exhaust gas purification catalyst to a desired shape in accordance with the intended application.

<Substrate>

The substrate makes up the skeleton of the exhaust gas purification catalyst. As the substrate, there can be used substrates of various materials and forms that are conventionally used in this kind of applications. For instance, substrates made of a highly heat-resistant ceramic such as cordierite, aluminum titanate, silicon carbide (SiC) or the like, as well as substrates made of alloys, for instance stainless steel, can be used herein.

The shape of the exhaust gas purification catalyst may the same as that of conventional exhaust gas purification catalysts. As an example, the substrate may be a honeycomb substrate 1 having a cylindrical outer shape, as illustrated in FIG. 1, with a plurality of through-holes (cells) 2, as an exhaust gas flow channel, provided in the cylinder axis direction, such that exhaust gas can come into contact with partition walls (rib walls) 4 that partition the cells 2. The capacity of the substrate 1 (volume of the cells 2) may be ordinarily 0.1 L or greater (preferably 0.5 L or greater), and is for instance 5 L or smaller (preferably 3 L or smaller, more preferably 2 L or smaller). The total length of the substrate 1 along the exhaust gas flow direction can be set ordinarily to about 10 to 500 mm (for instance 50 to 300 mm). Besides a honeycomb shape, a foam shape, a pellet shape or the like can be adopted as the shape of the substrate 1. Besides a cylindrical shape, the outer shape of the substrate 1 as a whole may be an elliptical cylinder shape, a polygonal shape or the like.

<Catalyst Layer>

The catalyst layer, as the site where exhaust gas is purified, is the main constituent of the exhaust gas purification catalyst, and is provided with catalyst metal particles functioning as an oxidation and/or reduction catalyst, and with a carrier that supports the catalyst metal particles. In the case for instance where the above-described honeycomb substrate 1 illustrated in FIG. 1 is utilized, a catalyst layer having predetermined properties (for instance length and thickness) is formed on the rib walls 4 of the substrate 1. A gas flow channel is formed in the space over the surface of the catalyst layer. The harmful components in the exhaust gas that is supplied to the exhaust gas purification catalyst are purified by coming into contact with the catalyst layer as the exhaust gas flows through the interior of the flow channel (for instance inside the cells 2) of the substrate 1. For instance, HC and CO in the exhaust gas are oxidized by virtue of the catalytic function of the catalyst layer, to be converted (purified) into water ($H_2O$), carbon dioxide ($CO_2$) or the like. Also, NOx is reduced by virtue of the catalytic function of the catalyst layer, to be converted (purified) to nitrogen ($N_2$).

FIG. 2 is a cross-sectional diagram illustrating schematically a typical embodiment of a catalyst layer 20 made up of the exhaust gas purification catalyst 10 disclosed herein. In this figure and FIG. 3 described below, the exhaust pipe of an internal combustion engine, not shown, is depicted such that exhaust gas flows in the direction denoted by the arrows in the respective figures. In the figures, the left side is the upstream side in the exhaust gas flow channel (exhaust pipe), and the right side is the downstream side of the exhaust gas flow channel. Specifically, the catalyst layer 20 illustrated in FIG. 2 is made up of a front section 24 including a leading end section 24a that corresponds to the upstream leading end in the exhaust gas flow direction, and a rear section 26 including a rear end section 26b that corresponds to a downstream rear end in the exhaust gas flow direction.

<Catalyst Metal>

Examples of noble metals that function as the oxidation and/or reduction catalyst provided in the catalyst layer include rhodium (Rh), palladium (Pd) and platinum (Pt). Other noble metals that may be used include ruthenium (Ru), osmium (Os), iridium (Ir), silver (Ag) and gold (Au). These metals may be used in the form of alloys. The metals may be in forms (typically alloys) that contain other metal species. Among the foregoing there are preferably used combinations of rhodium, which has high reducing activity, and palladium, which has high oxidizing activity.

The front section 24 of the exhaust gas purification catalyst 10 disclosed herein contains at least Pd as the noble metal, but other sites (for instance the rear section 26) are not particularly limited thereto. For instance, the rear section 26 can contain Rh as the noble metal. As a result, HC, CO and the like can be subjected to an oxidation treatment by Pd at the front section 24, while NOx and the like can be subjected to a reduction treatment by Rh at the rear section 26.

Preferably, the catalyst metal is used in the form of microparticles having a sufficiently small particle size, from the viewpoint of increasing the contact area with exhaust gas. The average particle size (average value of particle size determined by TEM observation; likewise hereafter) of the catalyst metal particles is ordinarily about 1 to 15 nm, and is preferably 10 nm or smaller, or 7 nm or smaller, and in particular 5 nm or smaller.

Although not particularly limited thereto, the content of catalyst metal per catalyst unit volume (1 L) is suitably about 0.1 to 5 g/L, and is preferably about 0.2 to 2 g/L. An excessive catalyst metal content is undesirable in terms of cost, while an excessively low catalyst metal content is undesirable in that the resulting exhaust gas purification ability in that case is low. In the present specification, the catalyst unit volume (1 L) denotes bulk volume of 1 L including the volume of internal voids (cells) in addition to the net volume of the substrate.

<Carrier and OSC Material>

An inorganic compound similar to that of conventional exhaust gas purification catalysts can be used as the carrier that makes up the catalyst layer 20 and that supports the above-described catalyst metal. Among the foregoing, there can be preferably used a porous carrier having a comparatively large specific surface area (herein specific surface area measured in accordance with a BET method; likewise hereafter). Preferred examples include alumina ($Al_2O_3$), ceria ($CeO_2$), zirconia ($ZrO_2$), silica ($SiO_2$), titania ($TiO_2$) and solid solutions of the foregoing (for instance a ceria-zirconia complex oxide (CZ complex oxide)), as well as combinations of the foregoing.

A characterizing feature of the exhaust gas purification catalyst disclosed herein is that the front section 24 does not contain an OSC material. Among preferred examples of the carrier, accordingly, a carrier that can function as an OSC material, such as ceria or a CZ complex oxide, is not used in the front section 24. For instance, alumina, zirconia or the like are suitably used therefore as the carrier at the front section 24.

In the present specification, the feature "containing no OSC material" pertaining to the catalyst layer front section that contains a catalyst metal denotes the feature of not containing a substance exhibiting $O_2$ storage capacity such that the $O_2$ storage amount per 1 mol of the substance at 500° C. exceeds 0.002 mol.

The reactivity of Pd with HC can be increased by configuring the front section 24 in the form of an OSC material-absent Pd-containing catalyst layer in which an OSC material is not co-present. Exhaust gas containing oxidizing components such as $O_2$ and NOx, along with HC and water vapor, is introduced into the front section 24, and as a result there can be increased the oxidation treatment efficiency of HC by Pd. It becomes therefore possible to effectively lower HC emissions in a state where a comparatively large amount of HC is generated, in particular during engine startup.

Meanwhile, an inorganic oxide (typically capable of functioning as a carrier) that functions as an OSC material is typically incorporated, in addition to an ordinary carrier such as alumina, into the rear section 26, such as the one illustrated in FIG. 2.

The OSC material itself is not particularly limited, so long as it is conventionally used as an OSC material in this kind of exhaust gas purification catalysts. Typical examples include oxides containing Ce such as ceria, complex oxides including ceria and zirconia as main constituents (i.e. CZ complex oxides) or the like. The CZ complex oxide that constitutes such an OSC material may be an oxide consisting only of three elements, namely cerium (Ce), zirconium (Zr) and oxygen (O). Alternatively, the CZ complex oxide may be for instance a complex oxide made up of four or more elements including yttrium (Y), lanthanum (La), niobium (Nb) and praseodymium (Pr), and other rare earth elements.

The carrier and the OSC material (for instance an alumina powder or a powder of a CZ complex oxide) may have a specific surface area of 50 to 500 $m^2/g$ (for instance about 200 to 400 $m^2/g$), from the viewpoint of heat resistance and structural stability. The average particle size may be typically about 1 to 500 nm (for instance 10 to 200 nm).

<Other Components>

The catalyst layer 20 can also contain various promoter components in addition to the carrier, the OSC material (excluding the front section 24) and the catalyst metal. Preferred examples of promoter components include alkaline-earth metals such as barium (Ba), strontium (Sr) and the like. Incorporating for instance an alkaline-earth metal component such as Ba (for instance in an amount of about 1 mass % to 10 mass % with respect to the catalyst layer as a whole) allows for temporary storage of NOx contained in the exhaust gas, while co-presence of Ba with Pd allows suppressing sintering of the Pd, thanks to electron donation from Ba to Pd, which in turn allows enhancing the catalytic activity of Pd. On the other hand, co-presence of Rh and Ba is undesirable since an inert Rh structure might be stabilized through donation of electrons from Ba to Rh, with an accompanying drop in NOx purification performance.

<Front Section and Rear Section Forms>

In the exhaust gas purification catalyst disclosed herein, the ratio (proportion) of the front section 24 is suitably 10% to 40%, and preferably about 20% to 35% (for instance about one third of the total length of the substrate 1), with respect to 100% as the total length of the substrate 1 in the exhaust gas flow direction within the exhaust pipe, from the upstream leading end (leading end section 24a). Quantitatively, the content of the portion that makes up the front section 24 of the catalyst layer 20 is suitably 20 g/L to 200 g/L, preferably 50 g/L to 150 g/L (for instance about 100±20 g/L) per catalyst unit volume.

By providing the front section 24 (i.e. OSC material-absent Pd-containing catalyst layer) in such a proportion, it becomes possible effectively perform an HC oxidation treatment by Pd in the front section 24, at a period during which unburned HC is emitted in comparatively large amounts, such as during engine startup.

Meanwhile, the ratio (proportion) of the rear section 26 in the exhaust gas purification catalyst disclosed herein is suitably 60% to 90%, from the downstream rear end (rear end section 26b). As illustrated in FIG. 2, part of the rear section 26 may overlap the front section 24, as viewed in a direction perpendicular to the surface of the substrate 1. In this case, the proportion of overlap of the front section 24 and the rear section 26 is not particularly limited, but preferably the overlap proportion is about 10% to 30% of the total length of the substrate along the exhaust gas flow direction.

Through partial overlap of the front section 24 (i.e. OSC material-absent Pd-containing catalyst layer) and the rear section 26 (for instance OSC material-present Rh-containing catalyst layer), as viewed in the above perpendicular direction, it becomes possible to achieve at a high level both an oxidation treatment of HC by Pd at the front section and exhaust gas purification treatment efficiency (in particular of a NOx reduction treatment) in the OSC material-present Rh-containing catalyst layer that is adjacent to the front section, at a period during which a comparatively large amount of HC is emitted, for instance during engine startup.

<Other Forms>

The catalyst layer 20 in the exhaust gas purification catalyst disclosed herein is not limited to a one-layer structure made up of the front section 24 and the rear section 26 arrayed in the exhaust gas flow direction, such as the one illustrated in FIG. 2. For instance, the catalyst layer 20 may have a multilayer structure such as the one illustrated in FIG. 3 (which is a two-layer structure). Specifically, a catalyst layer 30 in the embodiment illustrated in FIG. 3, a catalyst layer 30 of multilayer structure illustrated in FIG. 2, is configured in the form of a multilayer structure made up of two layers, namely catalyst first layers (lower layers) 34, 36 along the substrate 1, and relatively close to the substrate 1, and a catalyst second layer (upper layer) 38 that makes up the surface layer portion of the catalyst layer 30.

The catalyst layer 30 having such a multilayer structure allows using different carriers, and allows prescribing different types and content ratios of catalyst metal, OSC material, promoter component and so forth supported on the carriers, between the first layers 34, 36 and the second layer 38, similarly to conventional three-way catalysts.

A characterizing feature of this embodiment of the exhaust gas purification catalyst disclosed herein is also that the OSC material-absent Pd-containing catalyst layer 34 is provided in the front section 34. From the leading end section 34a up to the rear end section 36b, the catalyst first layer can be distributed for instance as about 2:8 to 4:6 (for instance 3:7 to 4:6), as viewed from the leading end section 34, with the upstream side as the front section 34 and the downstream side as the rear section 36. The front section 34 can be configured in the same way as in the above-described embodiment illustrated in FIG. 2 (that is, in the form of an OSC material-absent Pd-containing catalyst layer).

Meanwhile, various carriers, OSC materials, catalyst metals and promoter components can be used in the rear section 36 of the catalyst first layer and in the catalyst second layer 38.

For instance the rear section 36 of the catalyst first layer in the catalyst layer 30 of two-layer structure illustrated in FIG. 3 can support Pd as the catalyst metal, and can have incorporated thereinto an OSC material such as ceria or a CZ complex oxide, and a promoter component such as Ba or Sr (for instance barium sulfate, strontium sulfate) in addition to an ordinary carrier such alumina.

The entirety of the catalyst second layer 38 from the leading end section 38a up to the rear end section 38b can be configured as one OSC material-present Rh-containing catalyst layer in which Rh can be supported as the catalyst metal, and in which an OSC material such as ceria, a CZ complex oxide or the like is incorporated in addition to an ordinary carrier such as alumina. Alternatively the catalyst second layer 38 may be prescribed, similarly to the catalyst first layer, to be divided into a front section and a rear section along the exhaust gas flow direction, and to have mutually different configurations (for instance a front section in the form of a catalyst layer that contains Pd and/or Pt, and a rear section in the form of a Rh-containing catalyst layer).

The exhaust gas purification catalyst disclosed herein can be produced in accordance with a production method similar to those for producing conventional exhaust gas purification catalysts.

To produce for instance an exhaust gas purification catalyst 10 such as the one illustrated in FIG. 2 in which the configuration of the catalyst layer 20 differs between the front section 24 and the rear section 26, firstly a slurry for front section formation containing catalyst metal particles of Pd or the like, carrier particles of alumina, zirconia or the like (which may be alternatively be a carrier with catalyst metal particles of Pd or the like supported beforehand on the surface of the carrier) and a promoter component such as barium sulfate, is applied, for instance in accordance with a known wash coating method, to a portion of the honeycomb substrate 1 corresponding to the front section 24, from the leading end section 24a side.

Next, a slurry for rear section formation containing catalyst metal particles of Rh or the like, carrier particles of alumina, zirconia or the like (which may be alternatively be a carrier with catalyst metal particles of Rh or the like supported beforehand on the surface of the carrier), an OSC material such as a CZ complex oxide, and a promoter component such as barium sulfate, is applied, for instance in accordance with a known wash coating method, to a portion of the honeycomb substrate 1 corresponding to the rear section 26, from the rear end section 26b side.

Thereafter, the catalyst layer 20 made up of the front section 24 and the rear section 26 can be formed on the substrate 1 through firing at a predetermined temperature for a predetermined time. The firing conditions of the wash-coated slurries vary depending on the shape and size of the substrate and of the carriers, and accordingly are not particularly limited; however, the target catalyst layer can be formed typically through firing at about 400° C. to 1000° C. for about 1 to 5 hours.

Also an exhaust gas purification catalyst provided with a catalyst layer having a multilayer structure such as the one illustrated in FIG. 3 can be produced easily in accordance with a wash coating method or the like.

Specifically, firstly the front section 34 and the rear section 36 of the catalyst first layer may be formed on the substrate 1 as described above, followed by formation of the catalyst second layer 38. Specifically, a slurry for front section formation such as the one described above is applied, by wash coating, onto the surface of the substrate 1, from the leading end section 34a side in the exhaust gas flow direction. A slurry for rear section formation of desired composition is applied next, by wash coating, onto the surface of the substrate 1, from the rear end section 36b side in the exhaust gas flow direction. Next, a slurry for catalyst second layer formation of a desired composition is overlaid on the surface of the catalyst first layer (front section 34 and rear section 36) by wash coating or the like. The catalyst layer 30 of multilayer structure type can be then formed on the substrate 1 through drying and firing at a predetermined temperature for a predetermined time. The multilayer structure is not limited to being a two-layer structure, and may have three or more layers.

Alternatively, the catalyst second layer 38 may be formed in a process that involves performing two-stage firing instead of the above single firing process, namely by forming firstly the catalyst first layers 34, 36, through drying and firing after application of a slurry for front section formation and a slurry for rear section formation onto the surface of the substrate, and applying next a slurry for catalyst second layer formation onto the surface of the catalyst first layers 34, 36, followed by drying and firing.

Several examples pertaining to the present invention will be explained next, but the invention is not meant to be limited to the concrete examples illustrated below.

Test Example 1

Firstly there was assessed the influence exerted on exhaust gas purification performance (herein HC and NOx emissions) by the proportion (coating width) of the front section in the total length of the catalyst layer in the exhaust gas flow direction.

A honeycomb substrate (made of cordierite) having a cylindrical shape of diameter: 110 mm and total length: 95 mm was used in the present test example. A slurry for front section formation was prepared first as follows.

Specifically, an alumina powder and a barium sulfate powder were mixed to yield a mass ratio of 95 (alumina):5 (barium sulfate) and a suitable amount of an aqueous solution of palladium nitrate at an appropriate concentration was further added thereto. They were dried at 250° C. for 8 hours, and further fired at 500° C. for 4 hours, to obtain a Pd-carrying mixed powder having a Pd carrying ratio of 3 mass %. This Pd-carrying mixed powder was mixed with pure water to prepare thus a slurry for front section formation.

On the other hand, a slurry for rear section formation was prepared as follows.

Specifically, a powder of a $CeO_2$—$ZrO_2$ complex oxide (CZ complex oxide) and an alumina powder were mixed to a mass ratio of 1:1. An aqueous solution of rhodium nitrate of appropriate concentration was then further added thereto and mixed therewith, and the whole was dried at about 120° C. and was fired at about 600° C. for about 2 hours, to thereby prepare a Rh-supporting mixed powder having a Rh carrying ratio of about 0.05 mass %. This Rh-supporting mixed powder was mixed with pure water, to prepare a slurry for rear section formation.

A catalyst layer was formed on the above honeycomb substrate using the slurry for front section formation and the slurry for rear section formation thus prepared. Specifically, a respective portion of the substrate corresponding to 20%, 30%, 50% or 70% of the total length from the upstream side was wash-coated using the slurry for front section formation, and then dried, to thereby form on the substrate surface a front section (i.e. OSC material-absent Pd-containing catalyst layer) such that the content per catalyst unit volume was 100 g/L. Next, a portion of the substrate corresponding to 90% of the total length from the downstream side (therefore partially overlapping the front section) was washed-coated using the slurry for rear section formation, and then dried, to thereby form on the substrate surface a rear section (i.e. OSC material-present Rh-containing catalyst layer) such that the content per catalyst unit volume was 100 g/L.

Thereafter firing was carried out at 500° C. for 1 hour, to thereby produce four types of exhaust gas purification catalyst in which the front section and rear section were formed on the substrate according to the following respective distributions: front section 20%/rear section 90%; front section 30%/rear section 90%; front section 50%/rear section 90%; and front section 70%/rear section 90%.

Figure 4:
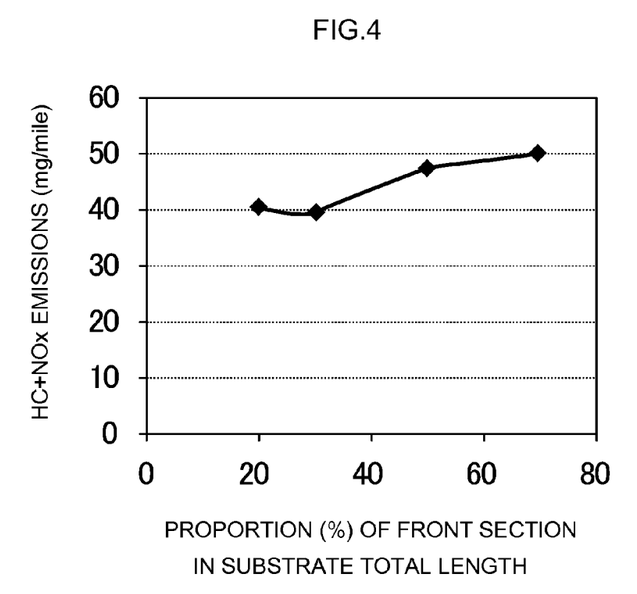
FIG. 4 is a graph illustrating the influence on exhaust gas purification performance (HC and NOx emissions) exerted by the proportion (coating width) taken up by a front section in the total length of a catalyst layer, in the exhaust gas flow direction.

The obtained four types of exhaust gas purification catalyst were subjected to an endurance treatment for 50 hours with engine exhaust gas at 900° C., and thereafter were fitted to the exhaust pipe of an automobile provided with a gasoline engine having a displacement of 2.2 L. An evaluation test of exhaust gas purification performance was carried out through running in "LA #4 mode", being a test mode in America as stipulated in FTP75. FIG. 4 illustrates a graph of the results. The horizontal axis in the graph represents the formation proportion (%) of the front section with respect to the total length of substrate in the four types of exhaust gas purification catalyst produced above, and the vertical axis represents the total emissions (mg/mile) of hydrocarbons HC (specifically non-methane hydrocarbons=NMHC) and of NOx per measured run mile, in the above evaluation test.

As shown in the graph, it is revealed that a significant effect of lowering the total emissions of NMHC and NOx is exerted in the case where the proportion of the front section, which is the OSC material-absent Pd-containing catalyst layer, is 40% or lower (20% and 30% in concrete examples), from the comparison with the case where that proportion is 50% or higher.

Test Example 2

Next there was assessed the influence exerted on exhaust gas purification performance (herein HC emissions) by the presence of the OSC material in the front section of the catalyst layer in the exhaust gas flow direction.

A honeycomb substrate (made of cordierite) having a cylindrical shape of diameter: 110 mm and total length: 95 mm, identical to that in Test example 1 described above, was used in the present test example as well.

As slurries for front section formation, besides a slurry having the features prepared in Test example 1, a total of four types of slurry for front section formation 1 to 4 according to the present test example was prepared in a manner similar to the preparation method of Test example 1, except that part of the alumina powder to be blended was substituted by the CZ complex oxide powder used in the preparation of the slurry for rear section formation in Test example 1 above. The constitution (mass ratio) of the Pd-carrying mixed powder (Pd carrying ratio: 3 mass %) in the respective slurries was as follows.

Slurry 1=95 (alumina):0 (CZ complex oxide):5 (barium sulfate)

Slurry 2=90 (alumina):5 (CZ complex oxide):5 (barium sulfate)

Slurry 3=85 (alumina):10 (CZ complex oxide):5 (barium sulfate)

Slurry 4=65 (alumina):30 (CZ complex oxide):5 (barium sulfate)

Respective catalyst layers were formed on the honeycomb substrate using the slurries for front section formation 1 to 4 prepared above, and the slurry for rear section formation prepared in Test example 1. Specifically a portion of the substrate corresponding to 30% of the total length from the upstream side was wash-coated using any one of the slurries for front section formation 1 to 4, and then dried, to thereby form on the substrate surface a front section such that the content per catalyst unit volume was 100 g/L. Next, a portion (partially overlapping the front section) of the substrate corresponding to 90% of the total length from the downstream side was wash-coated using the slurry for rear section formation prepared in Test example 1, and then dried, to thereby form on the substrate surface a rear section (i.e. OSC material-present Rh-containing catalyst layer) such that the content per catalyst unit volume was 100 g/L.

Thereafter, firing was carried out at 500° C. for 1 hour, to thereby produce four types of exhaust gas purification catalyst in which the front section and rear section were formed on the substrate at a proportion of front section 30%/rear section 90%, and with mutually different front section configurations (amounts of CZ complex oxide).

Figure 5:
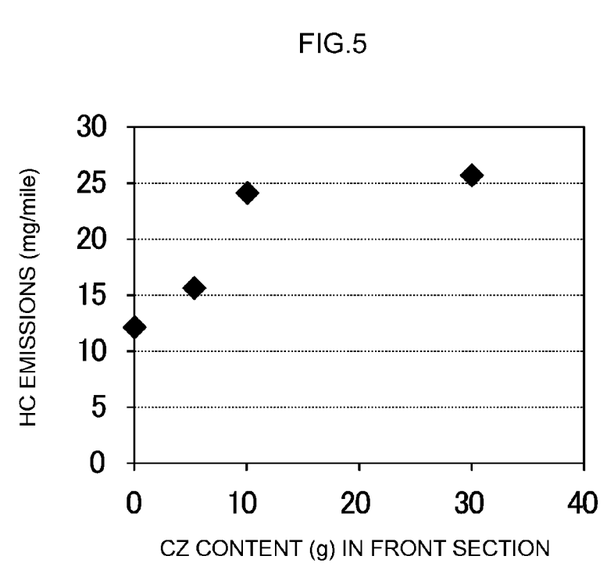
FIG. 5 is a graph illustrating the influence exerted on HC purification performance (HC emissions) by OSC material content in the front section.

The obtained four exhaust gas purification catalysts were subjected to an endurance treatment for 50 hours with engine exhaust gas at 900° C., and thereafter were fitted to the exhaust pipe of an automobile provided with a gasoline engine having a displacement of 2.2 L. Emissions (mg/mile) of non-methane hydrocarbons (NMHCs) for a Bag 1 phase were measured in a "LA #4 mode" run. FIG. 5 illustrates a graph of the results.

The horizontal axis in the graph represents the formation proportion (%) of OSC material in the front section of the four types of exhaust gas purification catalyst produced above, and the vertical axis represents NMHC emissions.

In the "LA #4 mode", "Bag 1" denotes a cold start phase, "Bag 2" denotes a transient phase and "Bag 3" denotes a hot start phase.

As the graph reveals, the lower the content of OSC material (CZ complex oxide) in the front section (Pd-containing catalyst layer) is, the lower NMHC emissions are.

Test Example 3

An exhaust gas purification catalyst having the multilayer structure (two-layer structure) illustrated in FIG. 3 was produced, and the exhaust gas purification performance of the catalyst was assessed.

In the present test example there was used a substrate in the form of a honeycomb substrate (made of cordierite) having a cylindrical shape with diameter: 110 mm and total length: 95 mm, identical to those of Test examples 1 and 2. A slurry for front section formation of the catalyst first layer was prepared first as follows.

Specifically, an alumina powder and a barium sulfate powder were mixed to yield a mass ratio of 80 (alumina):20 (barium sulfate), and an appropriate amount of an aqueous solution of palladium nitrate at an appropriate concentration was further added thereto. They were dried at 250° C. for 8 hours and further fired at 500° C. for 4 hours, to obtain a Pd-carrying mixed powder having a Pd carrying ratio of 3 mass %. This Pd-carrying mixed powder was mixed with pure water, to prepare a slurry for forming the front section of a catalyst first layer not containing an OSC material.

Meanwhile, an alumina powder, a barium sulfate powder and a CZ complex oxide powder were mixed to a mass ratio of 40 (alumina):20 (barium sulfate):100 (CZ complex oxide), and an appropriate amount of an aqueous solution of palladium nitrate at an appropriate concentration was further added thereto. They were dried at 250° C. for 8 hours and further fired at 500° C. for 4 hours, to obtain a Pd-carrying mixed powder containing an OSC material and having a Pd carrying ratio of 1 mass %. This Pd-carrying mixed powder was mixed with pure water, to prepare a slurry for forming the rear section of a catalyst first layer containing an OSC material.

Firstly a catalyst first layer was formed on the honeycomb substrate using the slurry for forming the front section of a catalyst first layer and the slurry for forming the rear section of a catalyst first layer, prepared above.

Specifically, a portion of the substrate corresponding to one third (about 34%) of the total length from the upstream side was wash-coated using the slurry for forming the front section of a catalyst first layer, and then dried, to thereby form a catalyst first layer front section (i.e. OSC material-absent Pd-containing catalyst layer) such that the content per catalyst unit volume on the substrate surface was 100 g/L. Next, a portion of the substrate corresponding to two thirds (about 67%) of the total length from the downstream side was wash-coated using the slurry for forming the rear section of a catalyst first layer, and then dried at 150° C. for about 1 hour, to thereby form a catalyst first layer rear section (i.e. OSC material-present Pd-containing catalyst layer) such that the content per catalyst unit volume on the substrate surface was 100 g/L.

Next the substrate was wash-coated using a slurry for rear section formation having been prepared in Test example 1 above, as the slurry for catalyst second layer formation, and then dried at 150° C. for about 1 hour, to thereby form a catalyst second layer (i.e. OSC material-present Rh-containing catalyst layer) on the surface of the catalyst first layer (front section and rear section) such that a content per catalyst unit volume is 100 g/L.

This was followed by firing at 500° C. for 1 hour, to thereby produce an exhaust gas purification catalyst of Sample 1 in which a catalyst layer having a vertical two-layer structure constituted by a catalyst first layer, made up of the above front section and rear section, and a catalyst second layer was formed on the substrate.

For comparison, there was prepared an OSC material-containing slurry for forming the front section of a catalyst first layer, in a manner similar to the above, except that alumina powder and a barium sulfate powder, and further ceria powder as an OSC material were mixed at a mass ratio of 80 (alumina):20 (barium sulfate):10 (ceria). An exhaust gas purification catalyst of Sample 2 was then produced in accordance with the same process and using the same materials as in Sample 1, except that there was formed a catalyst first layer front section (i.e. OSC material (ceria)-present Pd-containing catalyst layer) using the above slurry instead of the slurry for forming the front section of a catalyst first layer, such that on the substrate there were formed a catalyst layer having a vertical two-layer structure constituted by a catalyst first layer, made up of a front section (OSC material (ceria)-present Pd-containing catalyst layer) and a rear section (OSC material (CZ complex oxide)-present Pd-containing catalyst layer), and a catalyst second layer (OSC material-present Rh-containing catalyst layer).

The obtained exhaust gas purification catalysts of Sample 1 and Sample 2 were subjected to an endurance treatment for 50 hours with engine exhaust gas at 900° C., and thereafter were fitted to the exhaust pipe of an automobile provided with a gasoline engine having a displacement of 2.2 L. Emissions (mg/mile) of non-methane hydrocarbon (NMHC) and of NOx for a Bag 1 phase, a Bag 2 phase and a Bag 3 phase were measured through running in a "LA #4 mode". The results are given in Table 1.

TABLE 1

| Catalyst | Exhaust gas type | Bag 1 | Bag 2 | Bag 3 | Total |
|---|---|---|---|---|---|
| Sample 1 | NOx | 21 | 3 | 5 | 29 |
|  | HC | 26 | 3 | 3 | 32 |
| Sample 2 | NOx | 30 | 3 | 5 | 38 |
|  | HC | 34 | 3 | 3 | 40 |

(mg/mile)

Table 1 reveals that also in an exhaust gas purification catalyst provided with a catalyst layer of two-layer structure, such as the one of the present Test example 3, the catalytic activity of Pd can be enhanced, and NMHC emissions can be lowered in the Bag 1 (cold start) phase, by not incorporating an OSC material (CZ complex oxide) into the front section (Pd-containing catalyst first layer), similarly to the exhaust gas purification catalyst used in Test example 2. It was also found that the efficiency of the NOx purification treatment by Rh was enhanced at the same time.

Concrete examples of the present invention have been explained above in detail, but the concrete examples are illustrative in nature and are not meant to limit the scope of the claims in any way. The technology set forth in the claims includes variations and modifications of the concrete examples illustrated above.

REFERENCE SIGNS LIST

1 Substrate
2 Through-hole (cell)
4 Partition wall (rib wall)
10 Exhaust gas purification catalyst
20, 30 Catalyst layer
24, 34 Front section
24a, 34a, 38a Leading end section
26, 36 Rear section
26b, 36b, 8b Rear end section
38 Catalyst second layer

The invention claimed is:

1. An exhaust gas purification catalyst for being disposed in an exhaust pipe of an internal combustion engine and purifying exhaust gas emitted by the internal combustion engine, the catalyst comprising:
  a substrate;
  a catalyst layer formed on the substrate and containing at least palladium (Pd) and rhodium (Rh) as a metal functioning as an oxidation and/or reduction catalyst,
  a carrier that supports the metal, and
  an OSC material having oxygen storage capacity,
  wherein
    the catalyst layer has, when disposed in the exhaust pipe, a front section positioned upstream in an exhaust gas flow direction within the exhaust pipe, and a rear section positioned downstream of the front section in the exhaust gas flow direction;
    the front section contains palladium (Pd) as the metal but does not contain the OSC material; and
    a proportion of the front section of the catalyst layer, at an upstream leading end in the exhaust gas flow direction, is 10% to 40% with respect to 100% of a total length of the substrate.

2. The exhaust gas purification catalyst according to claim 1, wherein an OSC material-present Rh-containing catalyst layer that contains rhodium (Rh) as the metal and that contains the OSC material is formed in at least part of the top face of the front section, as viewed in a direction perpendicular to the surface of the substrate.

3. The exhaust gas purification catalyst according to claim 2, wherein the rear section contains rhodium (Rh) as the metal and contains the OSC material, and part of the rear section makes up the OSC material-present Rh-containing catalyst layer.

4. The exhaust gas purification catalyst according to claim 2, wherein
  the catalyst layer is a multilayer structure made up of at least two layers having mutually different configurations, as viewed in a direction perpendicular to the surface of the substrate; and with the front section and the rear section formed on the substrate being a catalyst first layer, and the layer formed on the first layer being a catalyst second layer, the front section of the catalyst first layer contains palladium (Pd) as the metal but does not contain the OSC material;

the rear section of the catalyst first layer contains palladium (Pd) as the metal, and contains the OSC material; and the catalyst second layer contains rhodium (Rh) as the metal and contains the OSC material.

5. The exhaust gas purification catalyst according to claim 1, wherein the catalyst layer is a multilayer structure made up of at least two layers having mutually different configurations, as viewed in a direction perpendicular to the surface of the substrate; and with the front section and the rear section formed on the substrate being a catalyst first layer, and the layer formed on the first layer being a catalyst second layer, the front section of the catalyst first layer contains palladium (Pd) as the metal but does not contain the OSC material;

the rear section of the catalyst first layer contains palladium (Pd) as the metal, and contains the OSC material; and the catalyst second layer contains rhodium (Rh) as the metal and contains the OSC material.

* * * * *